United States Patent
Govindarajan et al.

(10) Patent No.: US 11,546,305 B2
(45) Date of Patent: ***Jan. 3, 2023

(54) METHODS AND SYSTEMS FOR SECURE DNS ROUTING

(71) Applicant: DISH Network Technologies India Private Limited, Bengaluru (IN)

(72) Inventors: Jagan Govindarajan, Karnataka (IN); Gopikumar Ranganathan, Karnataka (IN); Jayachandrakumar Konduru, Karnataka (IN); Roopesh Gottipati, Karnataka (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 181 days.

This patent is subject to a terminal disclaimer.

(21) Appl. No.: 16/992,357

(22) Filed: Aug. 13, 2020

(65) Prior Publication Data
US 2020/0382473 A1    Dec. 3, 2020

Related U.S. Application Data

(63) Continuation of application No. 15/907,796, filed on Feb. 28, 2018, now Pat. No. 10,785,192.

(51) Int. Cl.
*H04L 9/40*    (2022.01)
*H04L 9/06*    (2006.01)
(Continued)

(52) U.S. Cl.
CPC ............ *H04L 63/04* (2013.01); *H04L 9/0643* (2013.01); *H04L 61/4511* (2022.05);
(Continued)

(58) Field of Classification Search
CPC ... H04L 63/04; H04L 9/0643; H04L 61/1511; H04L 61/2076; H04L 61/304;
(Continued)

(56) References Cited

U.S. PATENT DOCUMENTS 6,335,927 B1    1/2002  Elliott et al.
7,383,229 B2 *  6/2008  Jacoby .................. H04N 21/84
                                              348/E7.071
(Continued)

FOREIGN PATENT DOCUMENTS

WO    03081460       10/2003
WO    2010002761     1/2010

OTHER PUBLICATIONS

Nakamura, "A Special Purpose TLD to resolve IPv4 Address Literal on DNS64/NAT64 Environments draft-osamu-v6ops-ipv4-literal-in-url-02.txt", Internet Engineering Task Force, Ietf; Standardworkingdraft, Internet Society (Isoc) 4, Rue Des Falaises Ch-1205 Geneva, XP015102819, Oct. 27, 2014, pp. 1-12.
(Continued)

*Primary Examiner* — Shahriar Zarrineh
(74) *Attorney, Agent, or Firm* — Kilpatrick Townsend & Stockton, LLP

(57) ABSTRACT

Various arrangements for performing secure domain name system (DNS) routing are presented. A secure signature may be generated using an internet protocol (IP) address of an authorized device. An encoded character string may be generated that comprises the IP address. The domain name server may receive a request for an IP address mapped to the hostname. The hostname may be validated using the secure signature. The IP address of the authorized device may be decoded from the encoded character string at least partially in response to the hostname being validated by the domain name server. The IP address decoded from the encoded character string may be transmitted at least partially based on the hostname being validated and the request for the IP address.

20 Claims, 5 Drawing Sheets

(51) Int. Cl.
  *H04L 61/4511* (2022.01)
  *H04L 61/5076* (2022.01)
  *H04L 9/08* (2006.01)
  *H04L 67/02* (2022.01)
  *H04L 101/33* (2022.01)

(52) U.S. Cl.
  CPC ...... *H04L 61/5076* (2022.05); *H04L 63/0272* (2013.01); *H04L 63/10* (2013.01); *H04L 63/126* (2013.01); *H04L 63/168* (2013.01); *H04L 9/08* (2013.01); *H04L 67/02* (2013.01); *H04L 2101/33* (2022.05)

(58) Field of Classification Search
  CPC ... H04L 63/0272; H04L 63/10; H04L 63/126; H04L 63/168; H04L 9/08; H04L 67/02; H04L 2101/33
  See application file for complete search history.

(56) References Cited

U.S. PATENT DOCUMENTS

| | | | |
|---|---|---|---|
| 7,441,270 B1 | 10/2008 | Edwards et al. | |
| 7,647,614 B2 | 1/2010 | Krikorian et al. | |
| 7,995,756 B1 | 8/2011 | McKinney et al. | |
| 8,181,014 B2* | 5/2012 | Csaszar | H04L 45/00 713/153 |
| 8,185,741 B1 | 5/2012 | Agrawal et al. | |
| 9,436,773 B2 | 9/2016 | Milstead | |
| 9,819,648 B1 | 11/2017 | Chilakapati et al. | |
| 10,389,689 B2 | 8/2019 | Kanungo | |
| 10,742,696 B2 | 8/2020 | Govindarajan et al. | |
| 2003/0088767 A1 | 5/2003 | Emerson, III | |
| 2003/0126252 A1 | 7/2003 | Abir | |
| 2003/0131353 A1 | 7/2003 | Blom et al. | |
| 2004/0022222 A1* | 2/2004 | Clisham | H04L 69/18 370/469 |
| 2004/0162787 A1 | 8/2004 | Madison et al. | |
| 2004/0254887 A1 | 12/2004 | Jacoby | |
| 2005/0021467 A1 | 1/2005 | Franzdonk | |
| 2006/0095472 A1* | 5/2006 | Krikorian | H04N 21/25891 375/E7.193 |
| 2006/0123478 A1 | 6/2006 | Rehfuss et al. | |
| 2006/0159100 A1* | 7/2006 | Droms | H04L 12/2856 370/395.2 |
| 2006/0271707 A1* | 11/2006 | Cheline | H04L 63/0823 709/245 |
| 2007/0217407 A1 | 9/2007 | Yuan et al. | |
| 2007/0239886 A1 | 10/2007 | Montemayor et al. | |
| 2008/0307108 A1* | 12/2008 | Yan | H04L 67/306 380/278 |
| 2009/0112814 A1* | 4/2009 | Statia | H04L 63/0236 |
| 2010/0005146 A1* | 1/2010 | Drako | H04L 51/48 707/E17.014 |
| 2010/0005191 A1* | 1/2010 | Drako | H04L 61/4511 709/238 |
| 2010/0005483 A1 | 1/2010 | Rao | |
| 2010/0036969 A1* | 2/2010 | Perry | H04L 67/303 707/E17.014 |
| 2010/0125626 A1 | 5/2010 | Lucas et al. | |
| 2010/0198043 A1 | 8/2010 | Holzer et al. | |
| 2011/0213887 A1* | 9/2011 | Hernanz | H04L 65/4069 709/227 |
| 2012/0096166 A1* | 4/2012 | Devarapalli | H04L 63/1441 709/226 |
| 2012/0170741 A1 | 7/2012 | Chen et al. | |
| 2013/0046864 A1 | 2/2013 | Behringer et al. | |
| 2013/0250358 A1* | 9/2013 | Suzuki | H04L 65/1069 358/1.15 |
| 2014/0157298 A1* | 6/2014 | Murphy | H04N 21/64 725/110 |
| 2014/0181321 A1* | 6/2014 | Brzozowski | H04L 67/1036 709/245 |
| 2015/0222609 A1 | 8/2015 | Shah et al. | |
| 2016/0197898 A1* | 7/2016 | Hozza | H04L 63/0442 713/168 |
| 2016/0316006 A1* | 10/2016 | Zhang | H04L 61/4511 |
| 2016/0323260 A1 | 11/2016 | Francois et al. | |
| 2017/0093802 A1* | 3/2017 | Norum | H04L 61/1511 |
| 2017/0250797 A1 | 8/2017 | Goldstein | |
| 2018/0288117 A1* | 10/2018 | Mangalore | H04L 65/604 |
| 2018/0343122 A1* | 11/2018 | Spacek | H04L 61/1511 |
| 2019/0268389 A1 | 8/2019 | Govindarajan et al. | |

OTHER PUBLICATIONS

Application No. PCT/IN2019/050117, International Search Report and Written Opinion, dated May 7, 2019, all pages.
Application No. PCT/IN2019/050118, International Search Report and Written Opinion, dated Apr. 3, 2019, all pages.

* cited by examiner

METHODS AND SYSTEMS FOR SECURE DNS ROUTING

CROSS-REFERENCES TO RELATED APPLICATIONS

This application is a continuation of U.S. patent application Ser. No. 15/907,796, filed on Feb. 28, 2018, entitled "Methods and Systems for Secure DNS Routing," the entirety of which is hereby incorporated by reference for all purposes. U.S. patent application Ser. No. 15/907,796, is related to U.S. patent application Ser. No. 15/907,463, filed on Feb. 28, 2018, entitled "Replaying Media Content via a Relay Server System Without Decryption," the entirety of which is hereby incorporated by reference for all purposes.

BACKGROUND

Network-enabled devices that allow for the recording and storage of media are becoming commonplace. Such devices allow for the streaming or transmission of media across the Internet for playback at a remote network-enabled playback device. In order for an end-user device to be able to access a media server, the end-user device may need to determine an Internet protocol (IP) address of the media server. To do this, the end-user device may contact a domain name server.

SUMMARY

Various embodiments are described related to a method for performing secure domain name system (DNS) routing. In some embodiments, a method for performing secure domain name system (DNS) routing is described. The method may include generating, by an authorized device, a secure signature using an internet protocol (IP) address of the authorized device. The method may include generating, by the authorized device, an encoded character string that comprises the IP address. The method may include publishing, by the authorized device, a hostname. The hostname may be constructed using the secure signature, the encoded character string, and a designated domain name. The method may include receiving, by the domain name server from an end-user device, a request for an IP address mapped to the hostname. The method may include validating, by the domain name server, the hostname using the secure signature. The method may include decoding, by the domain name server, the IP address of the authorized device from the encoded character string at least partially in response to the hostname being validated by the domain name server. The method may include transmitting, by the domain name server to the end-user device, the IP address decoded from the encoded character string at least partially based on the hostname being validated and the request for the IP address.

Embodiments of such a method may include one or more of the following features: Validating the hostname may include determining whether the secure signature was generated using an authorized key. The domain name server may decode the IP address of the authorized device from the encoded character string without using a database that maps with uniform resource locators (URLs) with IP addresses. The method may include creating a subdomain comprising the encoded character string and the secure signature. The hostname may include the created subdomain and the designated domain name. The authorized device may be a private media server. The method may include receiving, by the authorized device at the IP address from the end-user device, a request to stream television programming. The method may include storing, by the authorized device, a key for use in generating the secure signature. The secure signature may be generated by the authorized device using the stored key. The request for the IP address mapped to the hostname may be received as part of an HTTPS (Hypertext Transfer Protocol Secure) request. The IP address may be decoded exclusively from the encoded character string.

In some embodiments, a system for performing secure domain name system (DNS) routing is described. The system may include a private media server that streams video and audio content to one or more client devices. The private media server may be configured to generate a secure signature using an internet protocol (IP) address of the authorized device. The private media server may be configured to generate an encoded character string that comprises the IP address. The private media server may be configured to publish a hostname. The hostname may be constructed using the secure signature, the encoded character string, and a designated domain name. The system may include a domain name server that provides DNS routing for one or more domains. The domain name server may be configured to receive, from a client device, a request for an IP address mapped to the hostname. The domain name server may be configured to validate the hostname using the secure signature. The domain name server may be configured to decode the IP address of the authorized device from the encoded character string at least partially in response to the hostname being validated by the domain name server. The domain name server may be configured to transmit the IP address decoded from the encoded character string to the client device at least partially based on the hostname being validated and the request for the IP address.

Embodiments of such a system may include one or more of the following features: The domain name server being configured to validate the hostname may include the domain name server being configured to determine whether the secure signature was generated using an authorized key. The domain name server may decode the IP address of the authorized device from the encoded character string without using a database that may map with uniform resource locators (URLs) with IP addresses. The private media server may be configured to create a subdomain comprising the encoded character string and the secure signature. The hostname may include the created subdomain and the designated domain name. The private media server may be configured to receive, via the IP address from the client device, a request to stream television programming. The system may include storing, by the authorized device, a key for use in generating the secure signature. The secure signature may be generated by the authorized device using the stored key. The request for the IP address mapped to the hostname may be received as part of an HTTPS (Hypertext Transfer Protocol Secure) request. The IP address may be decoded exclusively from the encoded character string.

In some embodiments, an apparatus for performing secure domain name system (DNS) routing is described. The apparatus may include means for generating a secure signature using an internet protocol (IP) address of the authorized device. The apparatus may include means for generating an encoded character string that comprises the IP address. The apparatus may include means for publishing a hostname of an authorized device. The hostname may be constructed using the secure signature, the encoded character string, and a designated domain name. The apparatus may include means for validating the hostname using the secure signature. The apparatus may include means for decoding the IP address of the authorized device from the encoded character string at least partially in response to the hostname being validated by the domain name server. The apparatus may include means for transmitting, to the end-user device, the IP address decoded from the encoded character string at least partially based on the hostname being validated and the request for the IP address.

Embodiments of such an apparatus may include one or more of the following features: The means for validating the hostname may include means for determining whether the secure signature was generated using an authorized key. The means for decoding the IP address of the authorized device from the encoded character string functions without using a database that maps with uniform resource locators (URLs) with IP addresses.

DETAILED DESCRIPTION

In order to establish a secure session, such as using the hypertext transfer protocol secure (HTTPS) between a client device and a server device, the request for the secure session may be routed through a domain name system (DNS) server. Multiple DNS servers, such as a root name server and name servers associated with a top and second level domain may be contacted in order to determine an internet protocol (IP) address that is associated with a particular hostname. A name server that is specific to a particular top and second level domain may be present, such as for "mediaservers.org." This name server may be tasked with storing and providing IP addresses for hostnames within "mediaservers.org."

This name server may be specifically used to route connection requests from client devices to private streaming media servers that are operated by individual users. The name server may publish hostnames for the private media servers operating within a private network, such as a home local area network (LAN). It may be desirable for such a name server to function securely in that the device operating within the home local area network is authenticated to be a private streaming media server that has access rights to use the DNS name server and an associated relay server. It may also be desirable for the DNS name server to function efficiently. One possible way to make the DNS name server function more efficiently is to not have the DNS name server maintain a database that maps IP addresses of devices (e.g., private streaming media servers) with hostnames. Rather, the hostname can be determined by the DNS name server from the hostname itself. Therefore, the DNS name server can receive and publish a hostname, evaluate the hostname to determine if it was provided by an authorized device, and, in response to a request indicating the hostname, determine an IP address for the associated device (e.g., private streaming media server) from the hostname. Such an arrangement can allow the DNS name server to function securely and/or efficiently.

Figure 1:
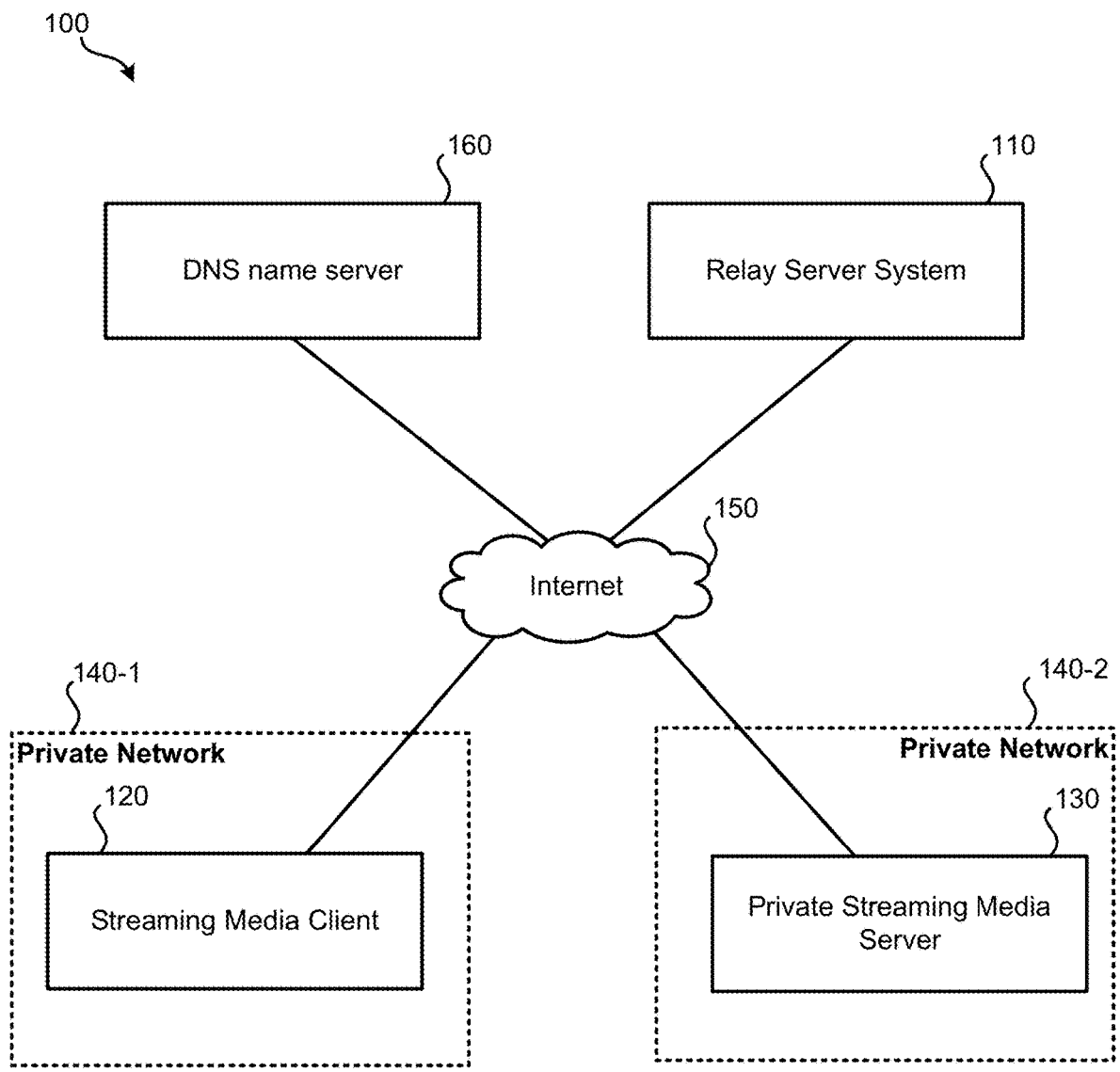
FIG. 1 illustrates an embodiment of a system for performing secure domain name system (DNS) routing without a database.

FIG. 1 illustrates an embodiment of a system 100 for performing secure domain name system (DNS) routing without a database. System 100 may include: relay server (RS) system 110; streaming media (SM) client 120; private streaming media (PSM) server 130; private networks 140 (140-1 and 140-2); Internet 150; and DNS name server 160. PSM server 130 may be a computerized device that receives television programming via one or more television distribution networks (e.g., cable, satellite, OTT, OTA), encodes the received video and audio, and stores and/or streams such encoded television programming to an SM client (which can be located locally as part of the same private network or remote and accessible via the Internet). PSM server 130 may also be called a television streaming media device. An example of a type of PSM server 130 may be a Slingbox® made by Sling Media®. PSM server 130 may be operated in association with a particular user account. That is, the media recorded and/or streamed live by PSM server 130 may only be permitted to be viewed by a particular user or users who have access to a particular user account linked with the entity operating RS system 110. PSM server 130 may be owned and operated by the particular user or users and may reside in a residence where the user receives television programming. PSM server 130 may be a computerized device and, therefore, may include one or more processors, one or more non-transitory computer readable mediums (e.g., memories, hard drives, solid state drives), one or more communication buses, one or more wired and/or wireless network interfaces, or one or more input ports to receive television programming (e.g., an HDMI port, a coaxial antenna port, component inputs, optical input, etc.).

PSM server 130 can be part of private network 140-2. Private network 140-2 may serve as a barrier between the local trusted private network and the Internet. Private network 140-2 may only permit outgoing network traffic and may block incoming communication requests. Therefore, for a device, such as PSM server 130, to communicate with a device located outside of private network 140-2, an outgoing communication session may be required to be established by PSM server 130. An incoming request that is unassociated with a previously-established outbound communication session may be prohibited by a gateway device of private network 140-2. Such a gateway device may be a wired or wireless router, or some other form of access point (AP) that serves as an interface between a LAN and an internet service provider (ISP). In other embodiments, PSM server 130 may not be part of a private network.

SM client 120 may be a computerized device that can output media for presentation. SM client 120 may directly output media for presentation, such as via an integrated speaker, integrated display screen, and/or integrated wired headphone jack or wireless headphone interface (e.g., a Bluetooth® interface). SM client 120 may be a computerized device and, therefore, also includes one or more processors, one or more non-transitory computer readable mediums (e.g., memories, hard drives, solid state drives), one or more communication buses, and one or more wired and/or wireless network interfaces. SM client 120 may be a smartphone, tablet computer, smart television, laptop computer, desktop computer, or gaming device. In some embodiments, SM client 120 is a device intended to be connected with a separate video and/or audio presentation device. For example, SM client 120 may not have an integrated display screen and/or integrated speaker, but rather may connect to another presentation device, such as a television for presenting received streaming media.

SM client 120 may function within private network 140-1. Private network 140-1 may function similarly to private network 140-2. Private network 140-1 may be separate and distinct from private network 140-2. For example, private network 140-1 may be located at a different residence within private network 140-2. Alternatively, private network 140-1 may be located in a location other than a residence. By SM client 120 and PSM server 130 being connected with Internet 150 via separate and distinct private networks 140, direct communication between SM client 120 and PSM server 130 may be difficult to establish due to both SM client 120 and PSM server 130 being required to establish communication sessions via outbound requests from within their respective private networks 140. In order to facilitate such communication, RS system 110 having an address (e.g., a uniform resource locator (URL)) may serve as an intermediary for communication between SM client 120 and PSM server 130. This URL may be translated by DNS name server 160 to point to an IP address (and, possibly, port) of PSM server 130 or of relay server system 110 that has been linked with PSM server 130. SM client 120 and PSM server 130 may communicate with RS system 110 and DNS name server 160 via Internet 150. It should be understood that in some embodiments one or more additional private or public networks are included as part of the communication path between SM client 120 and RS system 110 and/or PSM server 130 and RS system 110. It should further be understood that, in some embodiments, SM client 120 may not be part of private network 140-1.

While the above description is focused on an SM client and a PSM server, it should be understood that the DNS security and routing embodiments detailed herein can be used with respect to other forms of devices that are to be connected via a DNS name server. For instance, in some embodiments, SM client 120 may be a first computer system and PSM server 130 may be a second computer system.

DNS name server 160 may receive a request from SM client 120 directly or after SM client 120 has contacted one or more other DNS servers, which have, in turn, instructed SM client 120 to contact DNS name server 160. DNS name server 160 may be responsible for only DNS routing within a particular top and second level domain. For instance, DNS name server 160 may receive all DNS requests for "particularwebsite.com."

DNS name server 160 may not store or maintain a database that links IP addresses with hostnames. While SM client 120 may provide DNS name server 160 with a requested hostname, DNS name server 160 does not perform a lookup of an IP address. Rather, the IP can be determined using only information that is present within the hostname. The IP address provided by DNS name server 160 may be: 1) an IP address (and, possibly, port) of RS system 110 that has been linked with PSM server 130; or 2) the IP address (and, possibly, port) of PSM server 130 directly. Option 1 may be used if a firewall is used to block in-bound connection requests to a private network in which PSM server 130 is located. Option 2 may be used if in-bound connection requests to PSM server 130 are permitted.

After DNS name server 160 has authenticated the hostname and returned an IP address that properly routes SM client 120, RS system 110 may serve to relay communications between PSM server 130 and SM client 120. Such a relay of communications may include requests for media being routed from SM client 120 to PSM server 130 via RS system 110 and encrypted streaming media being routed from PSM server 130 to SM client 120 via RS system 110. In order for RS system 110 to be able to route a request for media (or some other form of message or communication) to PSM server 130, an outbound communication session from PSM server 130 may be required to be established with RS system 110. This requirement may be present due to PSM server 130 functioning as a part of private network 140-2, which blocks incoming communication requests. Therefore, PSM server 130 may maintain a persistent communication path with RS system 110 by periodically or occasionally establishing an outgoing communication session with RS system 110. By doing so, when RS system 110 has data to be transmitted as a message to PSM server 130, the message can be transmitted into private network 140-2 to PSM server 130 without being blocked by a firewall of private network 140-2. RS system 110 may be a group of one or more server systems that include one or more processors, one or more non-transitory computer readable mediums (e.g., memories, hard drives, solid state drives), one or more communication buses, and one or more wired and/or wireless network interfaces.

It should be understood that SM client 120 and PSM server 130 are typically owned by same user. A user may install and configure PSM server 130 at his residence to receive, record, and stream television programming. The user may then use SM client 120 at a remote location to be able to access the media recorded and streaming from PSM server 130. Therefore, while SM client 120 and PSM server 130 are functioning as part of distinct private networks, these devices can be owned and operated by the same user and, thus, a single username and password may be used to access PSM server 130.

Figure 2:
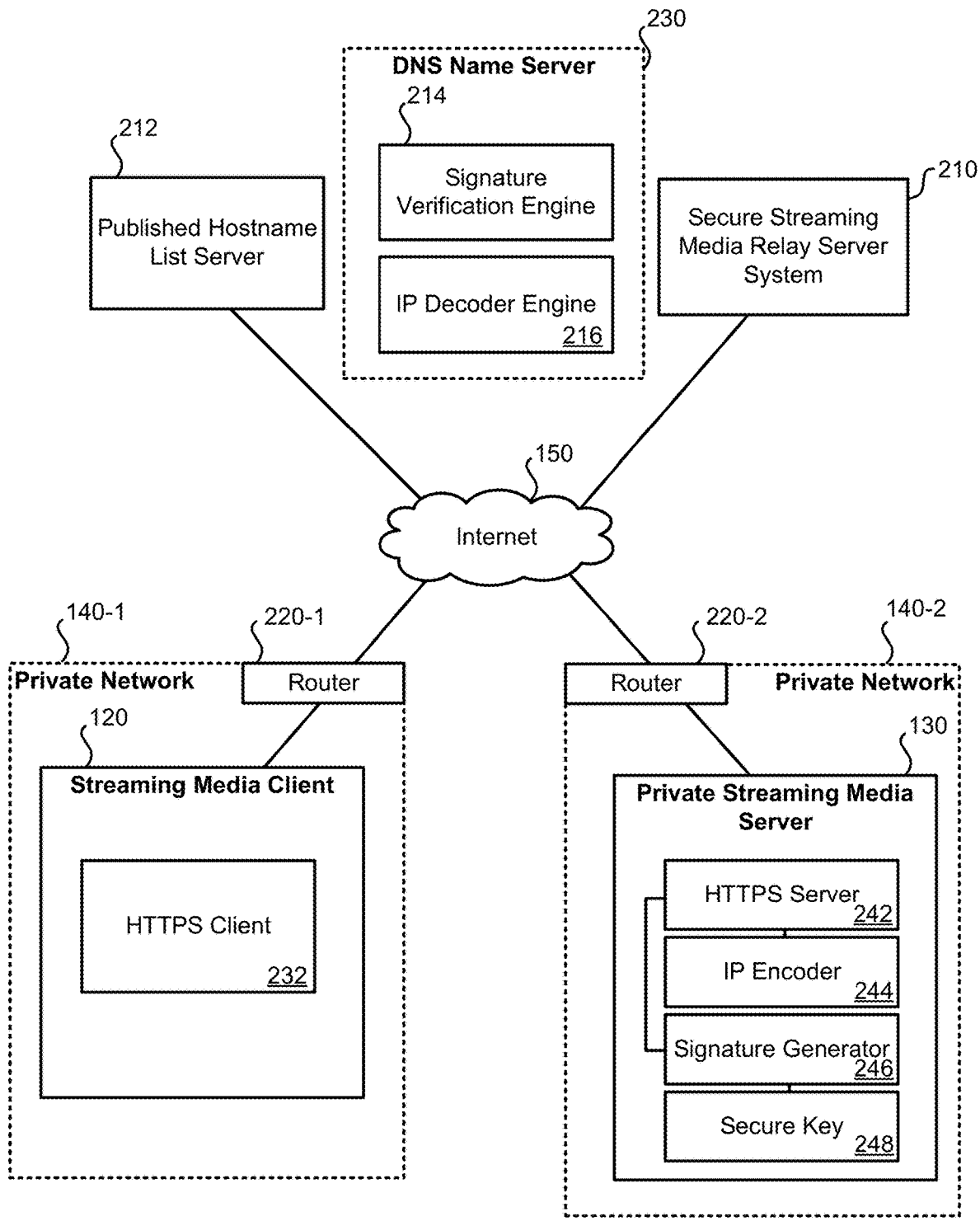
FIG. 2 illustrates another embodiment of a system for performing secure DNS routing without a database.

FIG. 2 illustrates another embodiment of a system 200 for performing secure DNS routing without a database. System 200 can represent a more detailed embodiment of system 100 of FIG. 1. In system 200, secure streaming media relay server (SSMRS) system 210 and DNS name server 230 are present.

In system 200, private network 140-1 is created by router 220-1. Router 220-1 may be a wired or wireless router that communicates with Internet 150 via an ISP. Router 220-1 may communicate using some form of ISP interface, such as a cable modem, fiber optic modem, or digital subscriber line (DSL) modem. Router 220-1 may function as a gateway device that creates a firewall that prevents inbound communication requests from being established with SM client 120. Router 220-1 may permit outbound communication requests from SM client 120 to devices accessible via the Internet 150, such as SSMRS system 210. Similarly, router 220-2 may create private network 140-1. Private network 140-1 may function similarly to private network 140-2, such that outbound communication sessions from PSM server 130 are permitted, but inbound communication sessions are blocked.

A secure communication session, such as an HTTPS communication session, between PSM server 130 and SM client 120 may be established in order to permit media to be transmitted from PSM server 130 to SM client 120. This secure media session may be established such that packets of media encrypted by HTTPS server 242, executed by PSM server 130, are passed (possibly encrypted) by SSMRS system 210 to HTTPS client 232, which is executed by SM client 120. The encrypted data packets are passed from HTTPS server 242 to SSMRS system 210. SSMRS system 210, in turn, readdresses the encrypted packets (without decrypting the data within the encrypted packets) and transmits the encrypted stream media data packets to HTTPS client 232. As such, encrypted streaming media (that is not decrypted by SSMRS system 210) is passed from HTTPS server 242 to HTTPS client 232 via Internet 150 and SSMRS system 210.

In order to establish the HTTPS communication session between SM client 120 and PSM server 130, since both devices are part of separate and distinct private networks, the secure communication session can be established through SSMRS system 210. Further, an HTTPS communication session may be required to be established via a DNS name server (rather than directly to a particular IP address). DNS name server 230 may be in communication with systems and devices via Internet 150.

PSM server 130 may include HTTPS server 242, IP encoder 244, signature generator 246, and secure key 248. IP encoder 244 may serve to encode an IP address of PSM server 130 (through external devices, such as SSMRS system 210, that can communicate with PSM server 130) into an encoded string of characters. This encoded string of (e.g., alphanumeric) characters may be decodable by another device that has access to the algorithm according to which encoding was performed by IP encoder 244. IP encoded 244 may be in the form of software, hardware, or firmware that performs encoding according to a particular algorithm. In some embodiments, rather than encoding the IP address, the IP address may be maintained in an encoded form.

Signature generator 246 may generate an encrypted signature using the IP address of PSM server 130. Signature generator 246 may use stored secure key 248 to generate the signature. Similar to the encoded IP address, the signature may be a string of (e.g., alphanumeric) characters. Secure key 248 may be stored such that it cannot easily be accessed by a user or external device. Signature generator 246 and secure key 248 may be in the form of software, hardware, or firmware that performs encryption according to a particular algorithm using secure key 248.

PSM server 130 may generate a third (or higher) level domain name that is to be published to a cloud-based (Internet-based) server, such as published hostname list server 212. For instance, the URL may be: http://<encoded-IP>-<signature>.privatestreamingmediaserver.com. In this example, ".com" is the top level domain, "privatestreamingmediaserver" is the second level domain, and "<encoded-IP>-<signature>" is the third level domain. DNS name server 230 may serve as the name server for all subdomains within "privatestreamingmediaserver.com." PSM server 130 may transmit the generated hostname to published hostname list server 212. In other embodiments, some or all of the various components of the hostname (e.g., the encoded IP address, the signature) may be transmitted to published hostname list server 212, which may then generate the hostname for publishing. SM client 120 can contact published hostname list server 212 to determine a hostname from which SM client 120 is to request content. SM client may then use the retrieved hostname to contact DNS name server 230 to obtain an IP address for PSM server 130.

Published hostname list server 212 may include a stored, published hostname list, which may be stored to a non-transitory processor-readable medium. In some embodiments, rather than a hostname list being hosted by published hostname list server 212, the published hostname list may be stored elsewhere in the cloud and accessible via the Internet. The published hostname list may include hostnames that have been received from various PSM servers 130. DNS name server 230 may serve as the name server for hundreds or thousands of PSM servers operating within a particular second level domain (which may also be the same second level domain as SSMRS system 210). The published hostname list can include hostnames, but such hostnames are not explicitly mapped to a stored IP address. As such, no database by DNS name server 230 maps IP addresses of PSM servers to hostnames of PSM servers. In some embodiments, the published hostname list does not need to be maintained because the IP address and whether the PSM server is authorized can be determined based on the hostname received from requesting SM client 120. Additional information, such as user registration details, PSM server identifiers, and WAN IP addresses corresponding to the PSM servers may be stored at DNS name server 230 and/or elsewhere accessible via Internet 150.

Rather than maintaining such as a database, DNS name server 230 determines an IP address of PSM servers 130 by decoding the encoded IP address portion of the hostnames. IP decoder engine 216 may decode the portion of the hostname that represents the encoded IP address (as encoded by IP encoder 244). Signature verification engine 214 may have access to the same secure key as secure key 248 or a corresponding secure key that can be used to decrypt or verify the secure key included as part of the hostname. Signature verification engine 214 may be used to determine if PSM server 130, which supplied the hostname or portions of the hostname, is an authorized device that is permitted to have its hostname published by DNS name server 230. Signature verification engine 214 may verify a signature: 1) on receipt of the hostname or partial hostname from PSM server 130; 2) some time after receipt but prior to receiving a request for the hostname from SM client 120; or 3) in response to a request for the hostname from SM client 120.

If signature verification engine 214 does not verify a signature of a hostname, the hostname may be removed from the published hostname list. Alternatively, a response requesting an IP address linked with an unauthorized hostname may result in either no response being transmitted by DNS name server 230 or in an error message being transmitted to the requesting SM client.

In response to a request for an IP address associated with a hostname from SM client 120, DNS name server 230 may decode the IP address from the hostname and provide the IP address to SM client 120 if the signature was determined to be valid and associated with an authorized device. The IP address (and possibly port) provided by DNS name server 230 may refer to SSMRS system 210 which may, in turn, be configured to forward or otherwise route data to PSM server 130. In other embodiments, the IP address (and possibly port) provided by DNS name server 230 may refer directly to PSM server 130.

DNS name server 230 may be incorporated as part of SSMRS system 210 in some embodiments. By having SSMRS system 210 and PSM server 130 part of the same top and second level domain, the HTTPS session request from SM client 120 can be validly rerouted to PSM server 130. As an example, if RS system 214 has a top and second level domain of "streamingmediaserver.org," then PSM server 130 may be assigned a domain by DNS linked with SSMRS system 210 of "PSM_identifier.streamingmediaserver.org" by DNS server 218 in which "PSM_identifier" (which could include both the encoded IP address and signature) uniquely identifies PSM server 130 from other PSM servers that may be communicating with SSMRS system 210.

Figure 3:
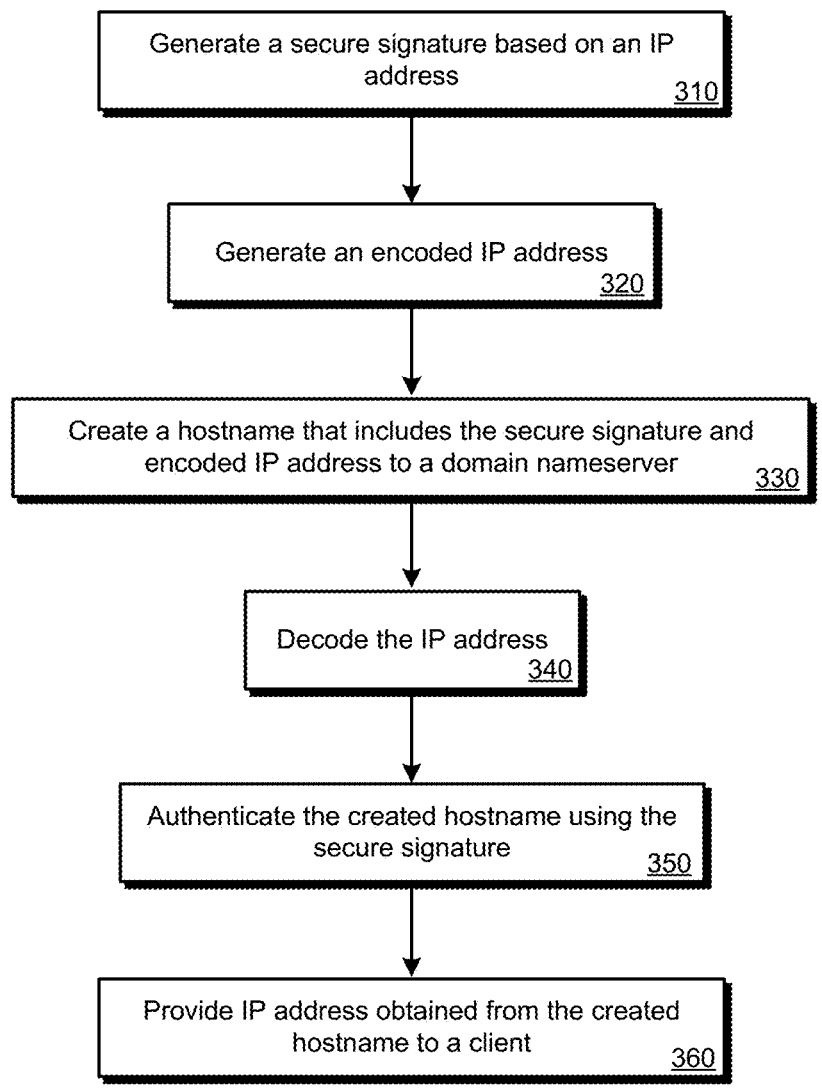
FIG. 3 illustrates an embodiment of a method for performing secure DNS routing.

Various methods may be performed using the systems described in FIG. 3, which illustrates an embodiment of a method for performing secure DNS routing. Each step of method 300 may be performed using either system 100 or system 200 of FIGS. 1 and 2, respectively. Method 300 may be used for having a DNS name server securely route an IP request for a PSM server (or some other form of electronic device that is to have its IP address published by a DNS name server).

At block 310, a secure signature may be generated based on an IP address. This signature may be generated by a PSM server (or some other form of electronic device that is to have its IP address published by a DNS name server). The secure signature may be generated by encrypting or hashing the IP address of the PSM server 130 (or the IP address of router 220-2 or some other device functioning as the gateway to private network 140-2). In some embodiments, PSM server 130 may not be part of a private network. Generation of the signature may include encrypting or hashing the IP address using a secure key, such as secure key 248. The signature may be composed of numbers, letters, or a mix of alphanumeric characters. In some embodiments, a hash-based message authentication code (HMAC) is used. This arrangement allows for simultaneous verification of data integrity and authentication of the message. The underlying cryptographic function may be MD5, SHA-1, or some other function.

At block 320, an encoded IP address may be created. This encoded IP address may be created by the PSM server (or some other form of electronic device that is to have its IP address published by a DNS name server) or by the DNS name server itself. Encoding may involve obscuring the IP address using a predefined algorithm in such a way that the IP address can be decoded by the DNS name server. The encoded IP address may be composed of numbers, letters, or a mix of alphanumeric characters.

At block 330, a hostname may be created by the PSM server. The hostname may include the encoded IP address and the signature. The hostname may also include a stored and predefined first and second level domain. In some embodiments, the third, fourth, or higher level domain may be a combination of the encoded IP address and the signature. For instance, the format may be: "<encoded IP>-<signature>.predefineddomain.com" or "<signature><encoded IP>.predefineddomain.com." This hostname may also be created by the DNS name server based on the signature and/or encoded IP being provided by the PSM server.

At block 340, the IP address may be decoded by the DNS name server from the hostname. By decoding the IP address of the PSM server from the hostname, the DNS name server does not need to maintain a database that maps IP addresses to hostnames. At block 350, the hostname may be authenticated by the DNS name server. The DNS name server may authenticate whether the signature corresponds to an authorized device. Only devices that have access to the secure key may be authorized devices. The signature may be obtained by the DNS name server from the hostname and evaluated, using a locally stored copy of the key or corresponding key that permits verification. For instance, the keys may be a public/private key pair. In other embodiments, an arrangement such as HMAC may be used, as previously described.

At block 360, the IP address decoded from the hostname may be provided to the SM client (or whatever type of electronic device requested an IP address from the DNS name server). The IP address may only be provided by the DNS name server if authentication at block 350 determined that the PSM server is an authorized device by verifying the signature appended. Otherwise, a valid IP address may not be provided.

Figure 4A:
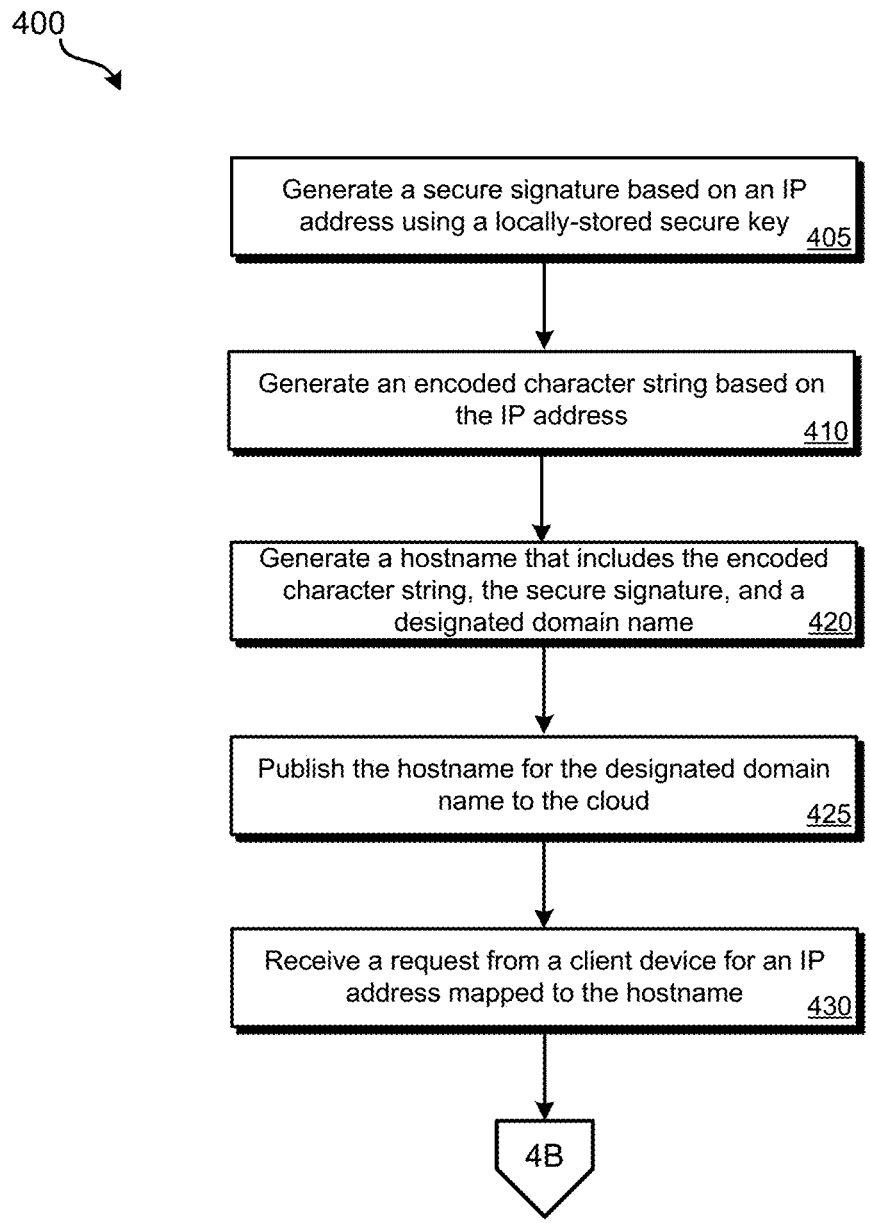
FIGS. 4A and 4B illustrate another embodiment of a method for performing secure DNS routing.
Figure 4B:
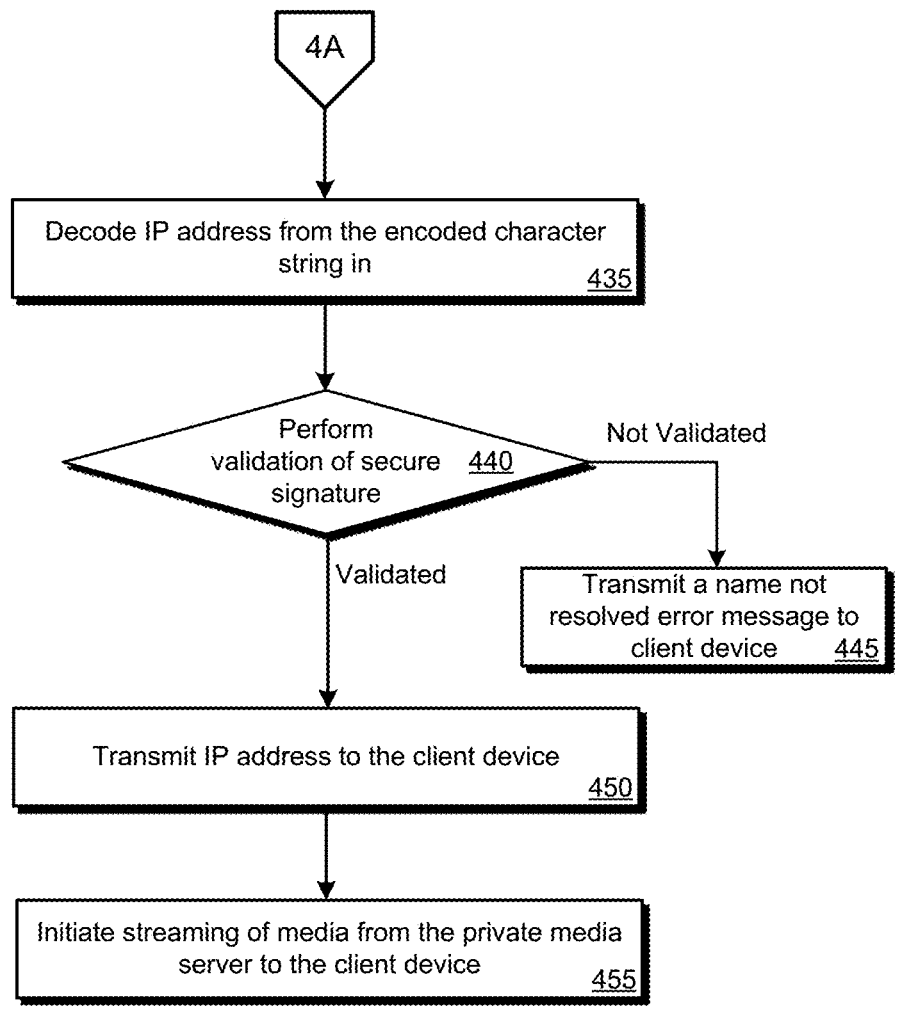

FIGS. 4A and 4B illustrate another embodiment of a method 400 for performing secure DNS routing. Method 400 can represent a more detailed embodiment of method 300 of FIG. 3. Each step of method 400 may be performed using either system 100 or system 200 of FIGS. 1 and 2, respectively. Method 400 may be used for having a DNS name server securely route an IP request for a PSM server (or some other form of electronic device that is to have its IP address published by a DNS name server).

At block 405, a secure signature may be generated, based on an IP address. This signature may be generated by a PSM server (or some other form of electronic device that is to have its IP address published by a DNS name server). The secure signature may be generated by hashing (e.g., using MAC/HMAC) or encrypting the IP address of the PSM server 130 (or the IP address of router 220-2 or some other device functioning as the gateway to private network 140-2). In some embodiments, PSM server 130 may not be part of a private network. Generation of the signature may include encrypting the IP address, using a secure key, such as secure key 248. The signature may be composed of numbers, letters, or a mix of alphanumeric characters. At block 410, an IP address may be encoded to be represented in alphanumerical characters that can be used to build a valid hostname.

At block 420, a hostname may be created by the PSM server. The hostname may include the encoded IP address and the generated secure signature. The hostname may also include stored and predefined first and second level domains. In some embodiments, the third, fourth, or higher level domain may be a combination of the encoded IP address and the signature.

At block 425, the generated hostname may be transmitted to or "published to" a cloud-based server, such as a published hostname list server, relay server system, or some other Internet-accessible server system. This generated hostname may be accessible by the DNS name server to allow the DNS name server to respond to requests for an IP address associated with the hostname. At block 430, the hostname may be stored and published as part of a hostname list. By the hostname being stored as part of a listing, the hostname has been published and can now, potentially, result in a response including an IP address if the hostname is requested by a client. At block 435, a request from a client device, such as an SM client, may be received that specifies the hostname. This request may be expecting an IP address (and, possibly, a port address) at which the PSM server can be contacted to be received in response. This IP address (and possibly port) may correspond to a relay server, directly to the PSM server, or to a gateway device that enforces a private network in which the PSM operates (e.g., router 220-2).

At block 435, the IP address may be decoded from the encoded IP address included as part of the hostname that is stored by the DNS server (or as received from the requesting client device). As such, no database mapping IP addresses to hostnames needs to be maintained by the DNS name server. Block 435 may involve an algorithm being used to decode the encoded IP address included in the hostname.

At block 440, the secure signature of the hostname may be verified by the DNS name server. The DNS name server may determine whether the signature corresponds to an authorized device. Only devices that have access to the secure key may be authorized devices. The signature may be obtained by the DNS name server from the hostname and evaluated using a locally stored copy of the key or corresponding key that permits verification of the signature. For instance, the keys may be a public/private key pair or a fixed key may be used to calculate a MAC/HMAC. In some embodiments, the secure signature is verified in response to a request of block 430. In other embodiments, the secure signature is verified prior to a request, such as prior to or following block 425. If the signature is not verified, block 445 is performed in which an error, such as a "name not resolved" error, may be transmitted in response to the request to the client device. In other embodiments, no response or a different type of error message may be provided.

If block 440 results in validation, method 400 may proceed to block 450. At block 450, the decoded IP address may be transmitted to the client from which the request was received. At block 455, the received IP address may be used by the client to initiate streaming of media between the PSM and SM client device. More generally, the IP address can be used to establish a secure or unsecure communication session, possibly via a relay server, between the two devices.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing secure domain name system (DNS) routing for a streaming media client, the method comprising:

receiving, by a domain name server from the streaming media client, a request for an IP address mapped to a hostname, wherein:
the hostname is constructed using a secure signature from a private streaming media (PSM) server device, an encoded character string and a designated domain name; and
the secure signature was generated by the PSM server device using a secure key;
validating, by the domain name server, the hostname using the secure signature and a corresponding secure key accessible by the domain name server to determine that the PSM server device is authorized to have the hostname published by the domain name server;
decoding, by the domain name server, the IP address of the PSM server device from the encoded character string of the hostname; and
transmitting, by the domain name server to the streaming media client, the IP address decoded from the encoded character string at least partially based on the hostname being validated and the request for the IP address.

2. The method for performing secure DNS routing of claim 1, wherein the PSM server device operates within a home local area network and receives television programming, stores the television programming, and streams the television programming to the streaming media client via the Internet.

3. The method for performing secure DNS routing of claim 2, wherein the PSM server device receives the television programming via an over-the-air (OTA) television antenna port.

4. The method for performing secure DNS routing of claim 2, wherein the PSM server device receives the television programming via a cable television distribution network or a satellite television distribution network.

5. The method for performing secure DNS routing of claim 1, wherein the domain name server decodes the IP address of the PSM server device from the encoded character string without using a database that maps uniform resource locators (URLs) with IP addresses.

6. The method for performing secure DNS routing of claim 1, further comprising:
generating, by the PSM server device, the secure signature using an internet protocol (IP) address of the PSM server device and the secure key;
generating, by the PSM server device, the encoded character string that comprises the IP address in an encoded form; and
publishing, by the PSM server device, the hostname such that the hostname is accessed by the domain name server.

7. The method for performing secure DNS routing of claim 6, further comprising:
creating a subdomain comprising the encoded character string and the secure signature, wherein the hostname comprises the created subdomain and the designated domain name.

8. The method for performing secure DNS routing of claim 1, further comprising:
receiving, by the PSM server device at the IP address from the streaming media client, a request to stream television programming; and
in response to the request, streaming, by the PSM server device, the television programming to the streaming media client.

9. The method for performing secure DNS routing of claim 7, further comprising:

storing, by the PSM server device, a key for use in generating the secure signature, wherein the secure signature is generated by the PSM server device using the stored key.

10. The method for performing secure DNS routing of claim 1, wherein the request for the IP address mapped to the hostname is received as part of an HTTPS (Hypertext Transfer Protocol Secure) request.

11. The method for performing secure DNS routing of claim 1, wherein the IP address is decoded exclusively from the encoded character string.

12. A system for performing secure domain name system (DNS) routing for a streaming media client, the system comprising:
a domain name server, comprising one or more processors and one or more non-transitory processor-readable mediums, the domain name server configured to:
receive, from the streaming media client, a request for an IP address mapped to a hostname, wherein:
the hostname is constructed using a secure signature from a private streaming media (PSM) server device, an encoded character string and a designated domain name; and
the secure signature was generated by the PSM server device using a secure key;
validate the hostname using the secure signature and a corresponding secure key to determine that the PSM server device is authorized to have the hostname published by the domain name server;
decode an internet protocol (IP) address of the PSM server device from the encoded character string of the hostname; and
transmit, to the streaming media client, the IP address decoded from the encoded character string at least partially based on the hostname being validated and the request for the IP address.

13. The system for performing secure DNS routing for the streaming media client of claim 12, further comprising the PSM server device, wherein the PSM server device operates within a home local area network and is configured to:
receive television programming;
store the television programming; and
stream the television programming to the streaming media client via the Internet.

14. The system for performing secure DNS routing for the streaming media client of claim 13, wherein the PSM server device comprises an over-the-air (OTA) television antenna port through which the television programming is received.

15. The system for performing secure DNS routing for the streaming media client of claim 14, wherein the PSM server device receives the television programming via a cable television distribution network or a satellite television distribution network.

16. The system for performing secure DNS routing for the streaming media client of claim 15, wherein the PSM server device is further configured to:
generate the secure signature using the IP address of the PSM server device and the secure key;
generate the encoded character string that comprises the IP address in an encoded form; and
publish the hostname such that the hostname is accessed by the domain name server.

17. The system for performing secure DNS routing for the streaming media client of claim 16, wherein:
the PSM server device is configured to create a subdomain comprising the encoded character string and the secure signature; and
the hostname comprises the created subdomain and the designated domain name.

18. The system for performing secure DNS routing for the streaming media client of claim 15, wherein the PSM server device is further configured to:
receive, from the streaming media client, a request to stream the television programming; and
in response to the request, stream the television programming to the streaming media client via the Internet.

19. The system for performing secure DNS routing for the streaming media client of claim 15, wherein the IP address is decoded by the domain name server from only the encoded character string.

20. The method for performing secure DNS routing of claim 1, wherein the secure key and the corresponding secure key are the same.

* * * * *